UNITED STATES PATENT OFFICE.

CARLOS E. CUMMINGS, OF GOWANDA, NEW YORK, ASSIGNOR TO EASTERN TANNERS GLUE CO., OF GOWANDA, NEW YORK.

METHOD OF TREATING WASTE WATERS.

1,263,532.  Specification of Letters Patent.  Patented Apr. 23, 1918.

No Drawing.  Application filed October 27, 1917. Serial No. 198,815.

*To all whom it may concern:*

Be it known that I, CARLOS E. CUMMINGS, a citizen of the United States, residing at Gowanda, in the county of Cattaraugus and State of New York, have invented a new and useful Improvement in Methods of Treating Waste Waters, of which the following is a specification.

This invention relates to the methods of treating domestic sewage or factory waste waters for the purpose of rendering the water neutral and sufficiently pure to permit it to be discharged into a stream without polluting the same or destroying animal or plant life.

The objects of the invention are to provide an improved method of this kind by means of which organic matter contained in the liquid may be separated therefrom and whereby the alkalinity of the water is destroyed so that the water can be discharged into a stream without injury to animal or plant life; also to provide a method of this kind which is inexpensive to carry out and which requires comparatively little attention; also to improve methods of this kind in other respects hereinafter specified.

Domestic sewage and factory waste containing organic matter is commonly treated by applying thereto caustic lime and permitting the heavy solids to settle from the solution, the lime having a disinfecting action on the sewage and also causing some of the organic matter to dissolve. The waste water from the washing of glue stock in glue factories contains large quantities of lime and also organic matter in solution and suspension, since the skins from which glue is made are treated for a time in milk of lime or lime water. The suspended organic matter consists, for example, of fine particles of skin, scraps of hair and epidermis, which escape through the openings of screens in the wash mills. The dissolved matters are coriin, mucus and others of the mucin group which are soluble in alkaline solution as well as other extractives, such as salts of organic acids, and a quantity of lime soap in an emulsified form produced by the action of the lime on the fats. These waste waters, as well as other waste waters containing lime and organic matter, can not be discharged into streams without polluting the same and destroying animal and plant life, and to neutralize the waste waters with acids to cause the lime to be changed to a soluble salt of an acid and to cause precipitation of organic matters is too expensive to be practical on a large scale and also requires careful treatment to insure the proper amount of acid being used, to just neutralize the water and not render the same acid.

In accordance with this invention, the waste waters, preferably after the large particles contained therein have been removed by a screen or the like, are treated by passing carbon dioxid gas or smoke through the liquid in sufficient quantities to cause all of the hydrated lime therein to be changed to calcium carbonate. While this causes a precipitation of the organic matters, it is not sufficient for the purpose of purifying the liquid, and careful experiments have proven that an excess of $CO_2$ converting a portion of the carbonate to bicarbonate will then cause the precipitated matters to form a floc or curd, this floc containing enough of the carbonate so that it then settles in masses of considerable size, leaving a perfectly clear supernatent solution which contains considerable dissolved acid carbonate. This floc if broken up by stirring, settles as readily as before. The gas may be passed into the liquid in any desired manner, being preferably introduced into the liquid in small jets or in finely divided form so as to cause the gas to come into intimate contact with the liquid to enable it to be quickly absorbed thereby. The carbon dioxid gas may be obtained from any desired source, a charcoal or coke fire having been found satisfactory in the treatment of waste water from glue factories where the organic matter precipitated in the solution forms a valuable by-product. In the treatment of sewage, smoke or flue gas from a coal fire is preferable since the coal tar and sulfur gases in the smoke form a disinfectant which tends to prevent the decay of the organic matter removed from the solution without decreasing its value as a fertilizer.

The smoke or carbon dioxid gas should be passed through the water until the water is no longer alkaline and contains a slight excess of calcium bicarbonate. The water after being treated with the smoke or gas passes into a tank where the organic matter and other material floating on the surface of the water is skimmed off and then preferably passes to a reservoir where it is allowed to stand long enough to permit the calcium carbonate to settle. The water is then free from all materials which might make it objectionable to discharge the water in a stream. The settling of the calcium carbonate may, however, be dispensed with and the water may be discharged into a stream before the calcium carbonate is settled, without harm to plant or animal life. The calcium carbonate however carries with it some organic matter and it is therefore desirable to remove the precipitate before discharging the water to a stream. Calcium carbonate is soluble in water in proportion to the contained carbon dioxid, so that by letting the water stand in a settling basin, as the carbon dioxid is discharged into the air, the calcium carbonate settles.

The treatment of waste waters and sewage by the method described has the advantage of being extremely economical to apply since the carbon dioxid gas or smoke may be obtained from any fire or other source, the gases being washed to remove impurities, if desired, and the method requires practically no attention since it is not essential to accurately determine the quantity of gas necessary to neutralize the solution, it being only necessary to supply enough smoke or gas to the liquid to produce an excess of bicarbonate. No harm results in passing an excess of carbon dioxid through the liquid, since the unabsorbed gas merely passes through the liquid without being taken up thereby and the liquid is not rendered permanently acid or harmful to vegetation or animal life by the gas. The process can be carried on continuously and requires no expensive apparatus. The method described can also be applied to the purification of waste water from packing houses or other sources containing large quantities of organic matter by first treating the water with lime to dissolve the organic matter therein and then treating the solution as hereinbefore described.

The passing of gas bubbles through the liquid also causes the flotation of grease or fats which can be skimmed from the surface of the liquid.

I claim as my invention:

1. The herein described method of treating waste liquids containing organic matter in solution, consisting of passing carbon dioxid through the liquid, causing precipitation of the organic matter, and removing the precipitate.

2. The herein described method of treating waste liquids containing lime and organic matter in solution, consisting of passing carbon dioxid through the liquid, and causing precipitation of the organic matter.

3. The herein described method of treating waste liquids containing lime and organic matter in solution, consisting of passing carbon dioxid through the liquid, causing precipitation of the organic matter, and removing the precipitate.

4. The herein described method of treating waste liquids containing organic matter in solution, consisting of passing carbon dioxid through the liquid sufficient to cause the formation of a floc or curd containing organic matter, and removing the floc.

5. The herein described method of treating waste liquids containing lime and organic matter in solution, consisting of passing carbon dioxid through the liquid in sufficient quantity to form a settling floc containing organic matter and lime, and removing the floc.

6. The herein described method of treating waste liquids containing lime and organic matter in solution, consisting of converting the lime into calcium carbonate and precipitating the organic matter by the action of carbon dioxid on the liquid, and removing the precipitated organic matter.

7. The herein described method of treating waste liquids containing lime and organic matter in solution, consisting of subjecting the liquid to the action of carbon dioxid to cause the lime in the liquid to be converted into calcium carbonate and to cause the organic matter to be precipitated, removing the floating organic matter, and permitting the calcium carbonate to separate from the liquid by settling.

8. The herein described method of treating waste liquids containing lime and organic matter in solution, consisting of blowing carbon dioxid gas into the liquid to change the lime to calcium carbonate and thereby cause the precipitation of the organic matter, and removing the precipitates from the liquid.

9. The herein described method of treating waste liquids containing lime and organic matter in solution, consisting of subjecting the liquid to the action of carbon dioxid to cause the lime in the liquid to be converted into calcium carbonate and to cause the organic matter to be precipitated, removing the precipitated organic matter, and permitting the remaining liquid to stand to permit carbon dioxid gas to be discharged therefrom to cause precipitation of the calcium carbonate.

10. The herein described method of treating waste liquids containing lime and organic matter in solution, consisting of blowing smoke through the liquid to cause the lime in the liquid to be converted into calcium carbonate and to cause the precipitation of the organic matter, and removing the precipitated organic matter.

11. The herein described method of treating waste liquids containing lime and organic matter in solution, consisting of subjecting the liquid to the action of carbon dioxid in sufficient quantity to more than overcome the alkalinity of the liquid, thus precipitating the organic matter and calcium carbonate in the liquid, separating the precipitated organic matter from the liquid, and separating calcium carbonate from the liquid by settling.

Witness my hand, this 24 day of October, 1917.

CARLOS E. CUMMINGS.

Witnesses:
WM. J. GUNNELL,
WM. H. BRITTON, Jr.

Correction in Letters Patent No. 1,263,532.

It is hereby certified that in Letters Patent No. 1,263,532, granted April 23, 1918, upon the application of Carlos E. Cummings, of Gowanda, New York, for an improvement in "Methods of Treating Waste Waters," an error appears in the printed specification requiring correction as follows: Page 1, line 57, for the article and word "a soluble" read *an insoluble;* and that the said Letters Patent should be read with this correction therein that the same may conform to the record of the case in the Patent Office.

Signed and sealed this 11th day of June, A. D., 1918.

[SEAL.]

F. W. H. CLAY,
*Acting Commissioner of Patents.*

Cl. 210—1.